Patented Feb. 27, 1934

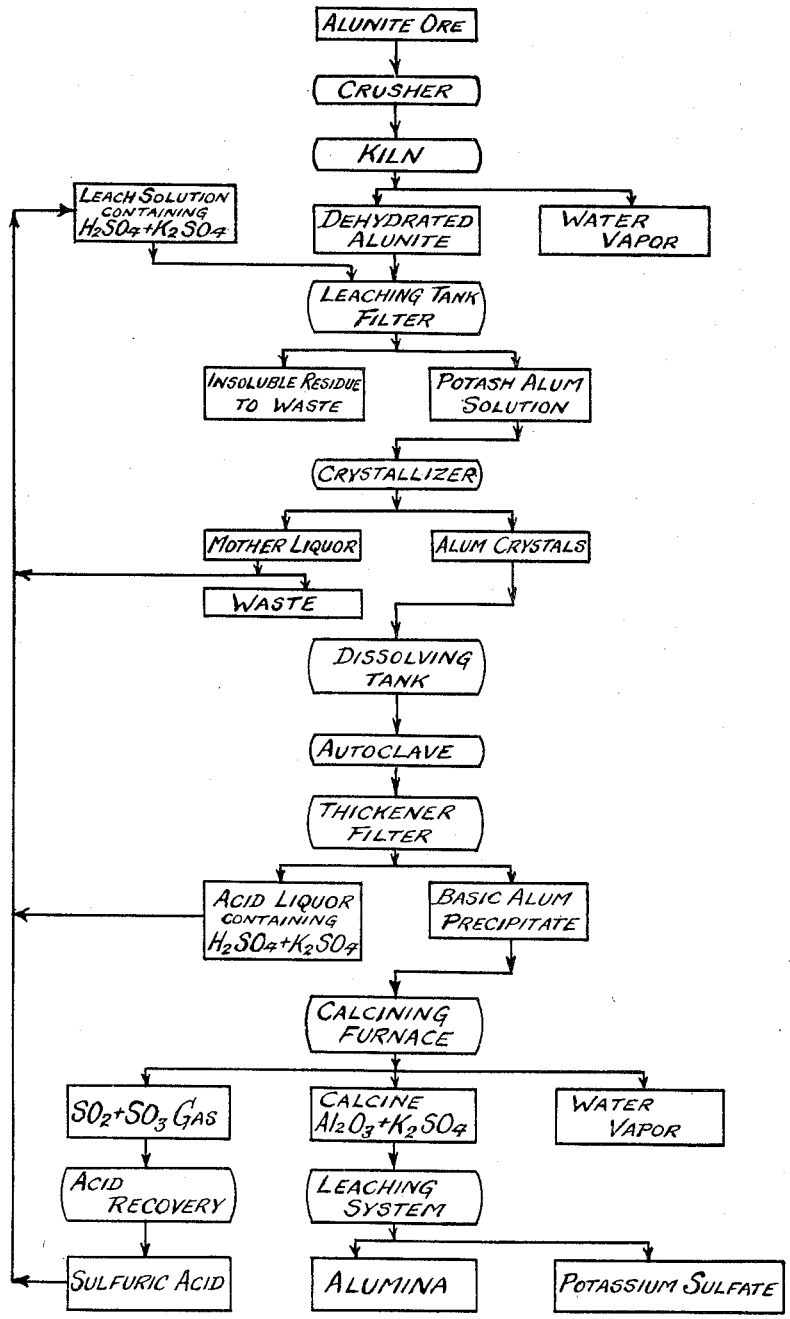

1,948,887

UNITED STATES PATENT OFFICE 1,948,887

METHOD OF MANUFACTURING ALUMINA

Walter Murray Sanders, deceased, late of Montclair, N. J., by Louise D. Sanders, administratrix, Montclair, N. J., assignor, by mesne assignments, to Kalunite Company, a corporation of Delaware Application April 22, 1932. Serial No. 606,909

4 Claims. (Cl. 23—143)

This invention relates to the manufacture of alumina. Heretofore, it has been proposed to manufacture alumina by a process in which a normal alum is calcined to eliminate from the aluminum sulphate constituent of the alum the sulphur trioxide combined with the alumina in the alum and then to separate the alumina thus produced from the alkali sulphate constituent of the alum by leaching and, to avoid difficulties incident to the fusibility of the alum, it has been proposed to dehydrate the alum before raising it to a calcining temperature sufficient to eliminate the sulphur trioxide. These processes have not been successful as practical manufacturing processes, owing to the expense and difficulty of effecting the preliminary dehydration of the alum and owing, also, to the tendency of the calcining operation to form pyrosulphates which form gummy masses at the temperature of the calcination, which prevents the complete dissociation of the alumina sulphate constituent; the formation of the gummy mass also seriously interferes with any practical furnacing of the alum.

It has been proposed to recover alumina from ammonium alum by the process above indicated but the difficulties involved in the dehydration of ammonium alum have been greater than is the case with alkali metal alum, largely due to the expansion of the material under treatment so that it forms a very light and porous dehydrated alum which is very difficult to treat by any practical furnacing operation.

It has also been proposed to manufacture potassium sulphate and recover impure alumina as a byproduct by calcining high grade alunite ores, that is to say, ores consisting largely of a compound of potassium, aluminum and sulphur of the following composition:

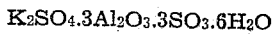

$K_2SO_4.3Al_2O_3.3SO_3.6H_2O$ at temperatures which will drive off the sulphur trioxide combined with the alumina constituent of the ore and then separating the soluble sulphate of potassium from the impure alumina thus produced by leaching. The alunite ores contain, in addition to the pure alunite compound above mentioned, various other constituents, such as silica, ferric oxide, titania, phosphorous pentoxide and calcium oxide and, in the described treatment of the alunite ore, these constituents remain associated with the alumina as impurities. The process involving the calcining of alunite ores has been found to involve very considerable dust losses and also to require an unduly protracted furnacing operation. The crushing operations involved in the treatment of alunite ores are also an element of considerable expense which, naturally, increases with the fineness of the particle size to which the ore is reduced while, on the other hand, for the best results both in eliminating the sulphur trioxide and the leaching out of the potassium sulphate, a very fine division is essential.

Another obvious drawback to the treatment of alunite ores is that, being a natural product, they vary considerably in composition and especially in the amount of impurities, thus necessitating, for the best results, constant changes and modifications of the conditions in the calcining and leaching operations.

It has also been proposed to produce alumina by calcining a normal aluminum sulphate but such a practice is objectionable for two reasons. First, that it involves great difficulties in the dehydration of the aluminum sulphate, and, second, that it produces a dehydrated sulphate of alumina in a very light and porous condition which it is difficult to handle in furnacing and from which, by reason of its very large surface, it is difficult to eliminate its sulphur trioxide constituent in any practical furnacing operation.

It has also been proposed to produce alumina by first producing a basic sulphate of alumina and calcining this material at temperatures which will eliminate its water and sulphur trioxide components. Such a process would probably avoid serious difficulties in dehydration and would probably result in the production of a substantially pure alumina but it is open to the objection that, so far as known, no process has been developed by which it is practical on a manufacturing scale to obtain the basic sulphate of alumina.

Attention has been called to the fact that in Swedish Patent 54,114 to G. H. Hultman, the patentee describes the production of what he describes in effect as a basic aluminum sulphate associated with small percentages of alkali metal or ammonium sulphate by a process which has been found in fact would and could only produce a basic alkali metal or ammonium alum and the patentee proposes to calcine his product to decompose the aluminum sulphate and convert it into alumina and then, in case of his product containing potassium sulphate, to leach the calcine to separate the soluble sulphate from the alumina. The patentee, however, gives no specific directions as to the temperature to be employed in the calcination except that he intimates a temperature of 1200° C. It is, however, as has been demonstrated, necessary for the practical production of a commercially available alumina from an alkali metal basic alum that the temperature of calcination should not be permitted to exceed 1000° C. as, otherwise, a reaction occurs between the alkali metal sulphate and the alumina, eliminating sulphur trioxide as a gaseous sulphur dioxide and oxygen and forming a potassium aluminate and, again, for the economical production of alumina from the basic alkali metal alum with recovery of a substantial amount of the sulphur trioxide constituent of the aluminum sulphate, it is necessary that the calcination should be carried on under conditions which will eliminate the combined water before the temperature is raised to a point at which the aluminum sulphate will be decomposed so that the sulphur trioxide component will be eliminated as an anhydrous gas or gases and as such readily convertable into sulphuric acid by familiar processes.

The object of this invention is to provide a method, by means of which alumina of practically any degree of purity desired can be produced by uniform and not unduly expensive methods of treatment and by means of which the byproducts incident to the production and separation of the alumina, can also be obtained in good condition for reuse or sale and, broadly speaking, this invention consists in employing as a base material a precipitated basic alum of fine particle size, calcining this basic alum at temperatures which will drive off water and the sulphur trioxide combined with the basic aluminum sulphate of the basic alum and which in the case of alkali metal alums will not volatilize alkali sulphate or induce reaction between alkali sulphate and alumina and then separating the alkali metal sulphate of the basic alum from the produced alumina by leaching.

The present invention is limited to a process involving the treatment of basic alums containing alkali metal sulphates, that is to say, the sulphates of potassium or sodium. Ammonium basic alums can also be used as a base material but, as the process differs in some respects from the process to which the alkali metal alums must be subjected, the claims in this case are confined to a process involving the treatment of alkali metal alums and protection will be applied for on the process involving the treatment of ammonium alums, in a separate application, Serial No. 606,910.

The composition of a precipitated basic potash alum is as follows:

$$K_2SO_4.3Al_2O_3.4SO_3.9H_2O$$

which differs from the somewhat similar compound constituting the mineral alunite and the physical condition of the precipitated basic potassium alum is quite different from anything which can be obtained by grinding alunite to a fine particle size, that is, the particles are naturally smaller than any particles to which it is commercially practicable to grind alunite and the composition or structure of the particles is such that the tendency to decrepitate during calcination, which exists in the case of alunite and is responsible for enormous dust losses, does not exist at all in the case of the precipitate. It is also true that while the particle size of the precipitated basic alum is exceedingly small, the particles retain during and after calcination pretty much the form of the original precipitate which makes the leaching out of the alkali metal sulphate a comparatively simple and thorough operation.

While precipitated basic alums, either of potash or soda, irrespective of their origin and mode of manufacture, can be used in my process, its most useful application will involve the use of ores of alumina as a base material and the treatment of such ores to extract therefrom their aluminum values, together with such potassium or sodium values as may also exist in the ores. The further use of these extracted values in the formation of a normal alum solution, preferable in most cases, involves such an addition of alkali metal sulphate as may be necessary to constitute the extracted solution a solution of a normal alum, the purification of the alum solution by the preparation therefrom of crystals of normal alum and the further steps of forming a solution of the normal alum crystals, heating it under pressure to a temperature which will result in the precipitation of the basic alum which, after separation of the mother liquor, is calcined to eliminate the water and sulphur trioxide combined with a basic alumina of the alum and then leached to separate the alumina from the soluble alkali metal sulphates resulting from the calcination. The temperatures to which the normal alum solution should be subjected in order to bring about a sufficiently rapid precipitation of the basic alum which will incorporate a sufficient amount of the alumina constituent of the normal alum, will be 180° to 200° C. Some precipitation will occur at as low a temperature as 140° C. and it is not advisable to exceed 200° C., as, above this temperature, the pressures involved are undesirably high. Using temperatures of 180° to 200° C., it is possible to precipitate from the normal alum solution a basic alum containing about 85% of the alumina content of the normal alum and this may be increased to about 95% if to the solution of normal alum is added additional alkali metal sulphate, preferably equivalent to the alkali metal content of the normal alum.

The mother liquor from which the basic alum has been precipitated will contain 55% of the acid which in the normal alum is combined with the alumina and will also contain 66% of the alkali metal sulphate content of the normal alum and these values can be salvaged by using this mother liquor in the treatment of ores to extract therefrom their aluminum and alkali metal values as a step in the preparation of a normal alum therefrom. In the treatment of an alunite ore, it has been found that this mother liquor will be normally found to have an acid strength of approximately 10%, which can be used for the treatment of a dehydrated alunite, as an acid of this strength is found sufficient to react with and bring into solution the alumina content of the dehydrated ore and, of course, the potassium sulphate content of the mother liquor is a valuable addition to the soluble potassium sulphates of a dehydrated ore, for the final building up of a normal alum solution.

With the exception of the preferred use of dilute acid solutions for the treatment of alunite ores, it is, generally speaking, true that the various steps necessary to extract the aluminum values and the potassium values, if present, from ores, and to utilize these values in the preparation of a solution of a normal alum, the separation from a normal alum solution of undesirable impurities and the crystallization of a normal alum from the solution, are not new, neither is it new to subject a normal alum solution to such high temperature as would result in the precipitation therefrom of a basic alum but it is believed it is entirely new to utilize a precipitated basic alum for the preparation therefrom of alumina by the process involving the calcination of the basic alum at a range of temperature which will neither volatilize the alkali metal sulphate constituent nor bring about a chemical reaction between it and the alumina and it is also new to carry on the calcination under conditions which will first eliminate from the basic alum combined water without decomposing the aluminum sulphate and then raising the temperature of calcination to a point or points not in excess of 1000° C. which will result in the decomposition of the aluminum sulphate with production of an anhydrous gas or gases of sulphur trioxide and sulphur dioxide, suitable for conversion into sulphuric acid, the process involving, of course, the separation of the pure alumina thus produced, from the soluble alkali metal sulphate, by leaching and it is also believed to be entirely new to treat an alunite ore for the successive preparation from its alumina and alkali metal values of a normal alum solution, the precipitation from this solution of a basic alum and the described treatment of the basic alum to produce alumina as an end product by this described process in which is utilized not only the mother liquor from which the basic alkali metal alum has been precipitated but also such portions of the sulphuric acid recovered from the anhydrous gases driven off in the calcination of the basic alum and such portions of the alkali metal sulphate separated from the alumina as are required to build up a normal alum solution in the leaching of the calcined alunite.

As an example of the application of the method to the production of a pure alumina from either a high grade or comparatively low grade alunite, the following is given:

The alunite ore is first crushed so that it will pass a screen of 8 mesh; the crushed alunite is then roasted to dehydrate it which can be effected at a temperature of 600° C. The dehydrated alunite is then treated with a solution of sulphuric acid which may be as low as 8% solution and which, preferably, consists of the mother liquor produced in the formation of the basic alum precipitate, with the addition of such fresh acid as may be necessary to bring about the formation of aluminum sulphate from the alumina constituents of the ore. This acid also acts as a leach to separate from the gangue of the ore its soluble constituents, consisting mainly of aluminum sulphate and the sulphate of potash. In the leaching of the dehydrated ore sufficient potassium sulphate must be added to bring about the formation of a solution which is essentially that of a normal alum. This additional potassium sulphate will be supplied in part by the mother liquor used in leaching the ore and in part by the addition of such potassium sulphate derived from the leaching of the calcined basic alum as may be necessary. The alum solution will next be separated from any suspended insoluble impurities by settling and filtering and the filtered solution will then be so reduced in temperature as to effect the crystallization of its normal alum content. This crystallization is effected for the purpose of eliminating from the alum such soluble impurities as can not be removed by the filtering operation and may not in all cases be necessary. The mother liquor from which the alum is crystallized will contain values which may be salvaged by using it in the leaching operations. The normal alum crystals are then dissolved in water, preferably to form a concentrated solution of about 80% alum and this solution is then heated under pressure to a temperature in excess of 140° C. and, preferably, to a temperature of approximately 200° C., with the result of forming and precipitating from it a finely divided precipitate consisting of a basic alum. This basic alum after separation from its mother liquor is then calcined, preferably by a furnacing operation which will first effect its dehydration, which can be effected at a temperature of 600° C. and then by raising its temperature to from 750° to 1000° C., at which temperatures the basic aluminum sulphate constituent of the basic alum is decomposed and its sulphur trioxide constituent driven off, partly as sulphur trioxide and partly as sulphur dioxide, from which gases sulphuric acid can be recovered by well known processes. After the elimination of the sulphur trioxide combined with the basic aluminum sulphate, the calcine is leached with water to dissolve and separate from the insoluble alumina the soluble potassium sulphate. This washing should, of course, be very thorough and, from the solution thus prepared, the potassium sulphate can be readily recovered by evaporation and crystallization. After separating the alumina from the solution of potassium sulphate, it must of course be thoroughly dried.

It is believed that a properly conducted calcination of the basic alum will substantially eliminate from its basic aluminum sulphate constituent substantially all of its sulphur trioxide component, it is pointed out that any residual sulphur trioxide combined with the alumina may be eliminated by leaching the alumina with a dilute solution of a reagent having a greater affinity for the sulphur trioxide than that of the alumina, such reagent having the property of forming with the sulphur trioxide a soluble sulphate. This chemical reagent can be used as a component of the leach water used in dissolving the potassium sulphate or it can be used to leach the alumina after it has been separated from the potassium sulphate. As examples of efficient reagents is mentioned the hydroxides and carbonates of ammonium, potassium and sodium.

By reference to the flow sheet forming a part of this specification, the above minutely described cyclical process for producing alumina from alunite ores as a starting material, with salvaging and cyclical re-use, to the extent desirable, of sulphuric acid and potassium sulphate values, can be readily followed.

Having now described the invention, what is claimed as new and desired to secure by Letters Patent, is:

1. The method of manufacturing alumina which consists in heating a solution of a normal alkali metal alum to temperatures in excess of 140° C. in order to precipitate therefrom a basic alkali metal alum consisting of a hydrated compound of alkali sulphate and basic aluminum sulphate, separating said compound from its mother liquor, calcining the precipitated basic alum at temperatures above 750° C. and below 1000° C. to dehydrate and decompose the aluminum sulphate constituent of the basic alum and drive off therefrom sulphur dioxide and/or sulphur trioxide gases, leaching the residual calcine to separate the insoluble alumina from the soluble alkali metal sulphate.

2. The method of manufacturing alumina which consists in heating a solution of a normal alkali metal alum to temperatures in excess of 140° C. in order to precipitate therefrom a basic alkali metal alum consisting of a hydrated compound of alkali metal sulphate and basic aluminum sulphate, separating said compound from its mother liquor, dehydrating the hydrated basic alum by heating it to temperatures between 500° and 600° C. for a sufficient length of time to volatilize the combined water, then heating the dehydrated basic alum to temperatures in excess of 750° and not to exceed 1000° C., to decompose the basic aluminum sulphate constituent of the dehydrated basic alum and volatilize the sulphur trioxide component thereof, partly as sulphur trioxide and partly as sulphur dioxide gas free from admixture with water, recovering said gases wholly or in part as sulphuric acid, leaching the residual product of the calcination, consisting of a mixture of alumina and alkali metal sulphate, to separate the soluble alkali metal sulphate from the insoluble alumina.

3. The method of manufacturing alumina which consists in treating aluminum ores, after a preliminary dehydration, with a sulphuric acid solution to convert the alumina content of the ore into a solution of aluminum sulphate and to bring into solution any alkali metal content of the ore, adding to the reaction mixture such alkali metal sulphate as will produce a solution of a normal alkali metal alum, treating a solution of said normal alkali metal alum, produced as above, at temperatures in excess of 140° C. to bring about the formation and precipitation of the finely divided precipitate of a basic alkali metal alum and of a mother liquor containing sulphuric acid, alkali metal sulphate and undecomposed normal alum, then dehydrating the basic alkali metal alum after separation from its mother liquor at temperatures between 500° and 600° C., then raising the temperature of the dehydrated basic alum to a point above 750° and not higher than 1000° C., to decompose the basic aluminum sulphate constituent of the dehydrated basic alum and volatilize the sulphur trioxide component thereof, partly as sulphur trioxide and partly as sulphur dioxide, free from admixture with water, recovering said gases, wholly or in part, as sulphuric acid, leaching the residual product of the calcination, consisting of a mixture of alumina and alkali metal sulphate to separate the soluble alkali metal sulphate from the insoluble alumina, using the acid mother liquor from which the basic alkali metal alum has been precipitated, together with acid recovered in the calcination of the basic alum and alkali metal sulphate separated from the alumina in the treatment of further bodies of ore for the preparation therefrom of a normal alkali metal alum, to be processed, as above described, for the production of alumina with recovery and utilization of the sulphuric acid and alkali metal sulphate constituents of the normal alum.

4. The method of claim 3 as applied to the production of alumina from alunite ores.

LOUISE D. SANDERS,
*Administratrix of the Estate of Walter Murray Sanders, Deceased.*